United States Patent [19]

Ryan

[11] Patent Number: 4,998,214
[45] Date of Patent: Mar. 5, 1991

[54] APPARATUS FOR LINE IMAGING

[75] Inventor: Robert T. Ryan, Langhorne, Pa.

[73] Assignee: Unisys Corp., Blue Bell, Pa.

[21] Appl. No.: 331,778

[22] Filed: Apr. 3, 1989

[51] Int. Cl.$^5$ .......................................... G01D 15/00
[52] U.S. Cl. ...................................... 364/519; 340/723
[58] Field of Search .............................. 364/518–523; 346/154; 340/723, 753, 754, 791

[56] References Cited

U.S. PATENT DOCUMENTS 4,543,645 9/1985 Vigarié ............................... 364/900

Primary Examiner—Arthur G. Evans
Attorney, Agent, or Firm—John B. Sowell; Mark T. Starr; Thomas J. Scott

[57] ABSTRACT

A high speed real time print head controller is provided for supporting a high resolution vector graphics command set which is employed to perform flexible high speed generation of textured line effects. Rows of continuous graphics line information are generated by a print head controller and modified by novel texture control means and style control means so that the bit information supplied to a shift alignment means under control of the style logic means is loaded into a bit map memory one parallel word at a time to completely load a page of information in the bit map memory in the desired styled and textured pixel format for presentation to a write head buffer for printout.

11 Claims, 3 Drawing Sheets

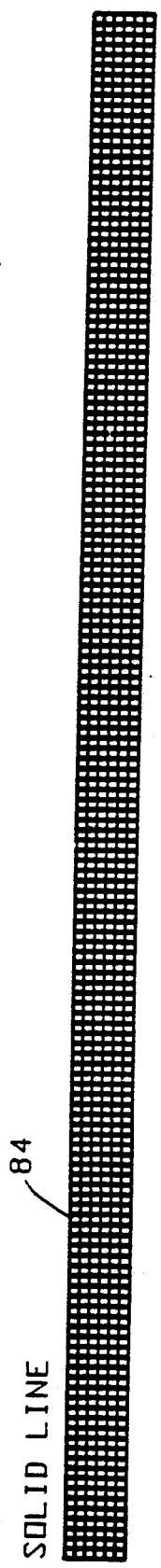
FIG. 3A SOLID LINE 84
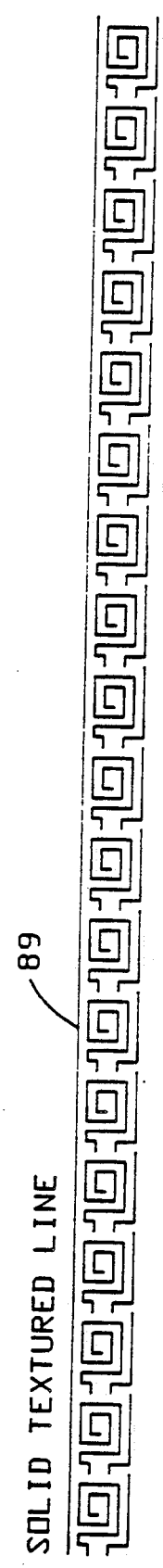
FIG. 3B SOLID TEXTURED LINE 85 89
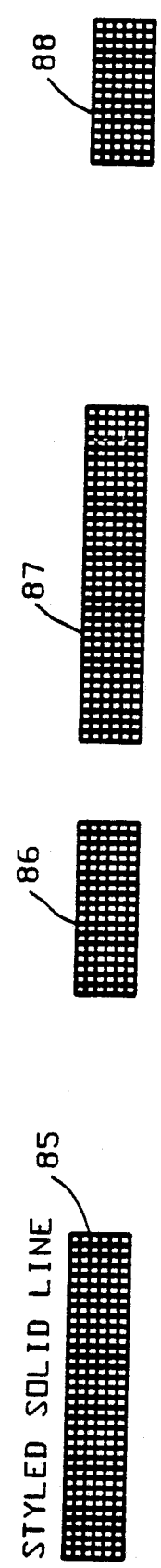
FIG. 3C STYLED SOLID LINE 86 87 88
FIG. 3D STYLED/TEXTURED LINE 91 92 93 94
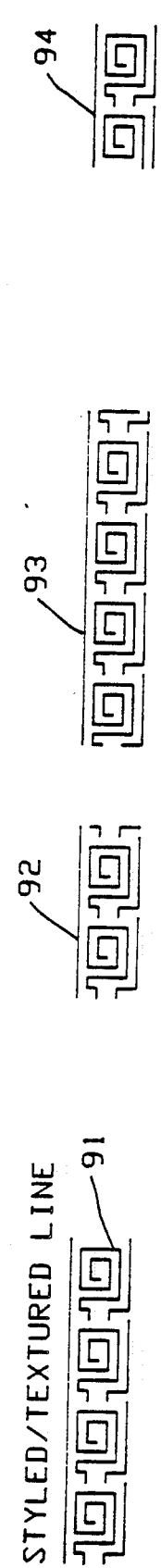

APPARATUS FOR LINE IMAGING

BACKGROUND OF THE INVENTION

1. Field of the Invention

The present invention relates to a print head control for real time style and texture modification of vector graphic line imaging More particularly, the present invention relates to a print head control for real time generation of vector graphics based on full line imaging to provide line attributes of style, texture and intensity without degrading the line quality or slowing the graphics speed output.

2. Description of the Prior Art

The present invention print head control is of the type which is adapted to control a laser print head or a print head comprising a plurality of rows of fixed position light emitting diodes Prior art laser printers required moving mirrors or optics in order to control the position of a laser beam similar to the electron beam of a cathode ray tube. Such laser printer controls are well known and are classified in U.S. Class 364, Subclasses 900 and 518 with other types of print head controls. More recently, LED modules have been commercially produced employing semi-conductor technology and high line definition resolution to permit up to 600 individual LED dot matrix positions per inch of module or array. Such modules have been combined to provide a continuous high definition dot matrix line which will extend over the length of a print head defining a page. In the present state of the art, such print heads are designed in-house by the user such as Eastman Kodak Siemens Gmbh; and Xerox, each of whom have designed their own controls Such prior art print head controls have employed software to accomplish style, texture and intensity imaging of vector graphic base lines When software is employed to accomplish modification of full-line imaging, a series of software steps are required which slow down the logic decision for line image generation.

It would be desirable to provide control apparatus which would permit high speed real time generation of vector graphics based on full line imaging to provide line attributes of style, texture and intensity without slowing the output capability of the bit map and print head associated with the print head controls.

SUMMARY OF THE INVENTION

It is a principal object of the present invention to provide a high speed print head control for real time generation of vector graphics based on full line imaging It is another principal object of the present invention to provide a high speed print head control for the generation of vector graphics based upon full line drawings during real time by alternately loading one bit map while reading out a second alternate bit map.

It is another principal object of the present invention to provide a high speed print head control for converting cartesian coordinates to physical memory addresses in a bit map.

It is another principal object of the present invention to provide a print head control usable with a print head having different page widths.

It is another object of the present invention to provide a high speed print head control employing a novel shift alignment apparatus for determining which bits of a plurality of bits of a word will be mapped into the bit map memory for printing.

It is another object of the present invention to provide a novel style logic controller capable of high speed style line imaging.

It is another principal object of the present invention to provide means for storing a plurality of different texture matrices.

It is a further object of the present invention to provide means for generating and defining texture matrices in a host computer and for storing texture matrices in a memory for real time access.

It is another general object of the present invention to provide a plurality of registers capable of defining style selection of graphic line information.

According to these and other objects in the present invention, there is provided a high speed print head control having a bit map for storing a full page of bit-word information to be printed Shift alignment logic means are coupled to the bit map and style logic means and texture memory means are coupled to the shift alignment logic means for generating plural word patterns to be stored in the bit map memory defined by style information associated with the style logic means and texture matrices stored in the texture memory means.

BRIEF DESCRIPTION OF THE DRAWINGS

FIGS. 3A to 3D are diagrammatic representations of line texture and style line information generated by the present embodiment print head control.

DESCRIPTION OF THE PREFERRED EMBODIMENT

Figure 1:
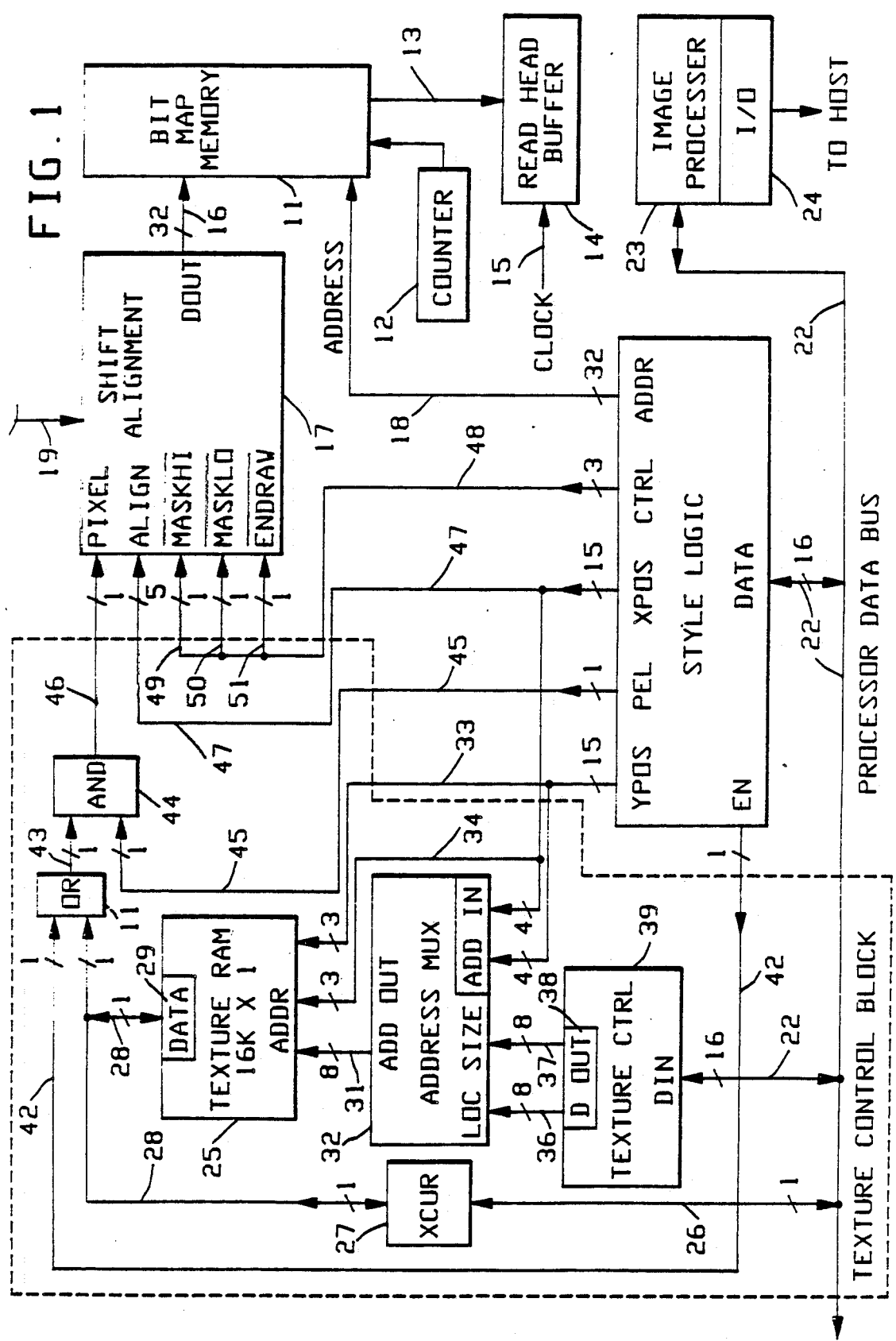
FIG. 1 is a general block diagram showing the preferred embodiment high speed print head control.

Refer now to FIG. 1 showing a block diagram of a print head controller 10 capable of generating straight lines or curved lines comprising straight line segments It will be appreciated that the line packing density of the pixel information is much higher than that required for a TV monitor or display, however, once the information is loaded into a bit map comprising a full page of pixel information, the information could be employed with high definition displays as well as print heads as will be explained with reference to the preferred embodiment. Accordingly, the information to be printed is stored in a dual or duplex bit map memory 11 which is read out under control of a counter 12 to supply information on lines 13 to a buffer write head 14 which may be accessed in parallel for a light emitting diode write head or accessed for serial read out by clock line 15 which is synchronized with the sweep of the laser beam for laser beam or electron beam scanners. The information stored in one of the bit maps 11 is read out while the other bit map is loaded in parallel via lines 16 from the date output of the shift alignment and mask means 17 which may be operated as a shift alignment apparatus for writing a word comprising a plurality of bits in an address in bit map memory 11 specified by address line 18.

When the shift alignment means 17 is not operated in a style-texture mode, it is possible to operate shift alignment means 17 in a text processing or character generating mode employing characters generated at a character generator (not shown) and supplied via line 19 to the shift alignment means 17.

In the preferred embodiment, words comprising 32 bits are loaded in parallel via lines 16 into the bit map memory 11 after being assimilated one bit at a time in the shift alignment mans 17 as will now be explained The preferred embodiment of the present invention employs in the print head control 10 style logic means 21 coupled via processor data bus 22 to image processor 23 that has an input/output port 24 which couples the image processor 23 to a host processor (not shown).

In the preferred embodiment, the style information is resident in the image processor 23 and the texture information is resident in the host computer and loaded via the image processor 23 and bus 22 into the texture memory RAM 25. The data path for loading the texture RAM 25 comprises bus 22, one bit path 26 coupled to the transmitter-receiver 27 and input/output line 28 connected to the data terminal 29 of texture RAM 25. The information being loaded into the matrix patterns via terminal 29 is identified by 14 address bits, 8 of which appear as variables on line 31 from the address output of address multiplexer 32. The three bits of fixed address information on line 33 identifies the Y position and the three bits of information on line 34 identify the X position. The address information on lines 33 and 34 comprise the three least significant bit positions of the 15 bit positions describing the X and Y bit positions in style logic means 21. Similarly, the next higher four bit positions of both the 15 X and Y bit position information on lines 33 and 34 is applied to the address input terminal 35 of the address multiplexer 32. This eight bit address information identifies or supplies the address information of a matrix within the texture RAM 25. In the preferred embodiment of the present invention, the smallest matrix identifiable is an 8×8 matrix and the largest matrix is a 128 by 128 matrix which is identified by two pairs of eight bits on lines 36 and 37 from the data output terminal 38 of the texture controller 39. The data output information on lines 36 and 37 is supplied to texture controller 39 as 16 bits from processor data bus 22 with information supplied by image processor 23. Thus, the variable information on line 31 locates the matrix to be used and the information on lines 33 and 34 identifies the address within the matrix. As each individual pixel bit is identified on output line 28 to the data input of OR gate 41 this texture data is either enabled or disabled by control information on line 42 originating at the style logic means 21. Output information on line 43 from OR gate 41 is applied to the enable input of AND gate 44 along with one bit of style data information on line 45 from the style logic means 21 to provide an on/off bit state signal on line 46 applied to the pixel input terminal of shift alignment means 17. The five bits of information on line 47 are applied to the alignment terminal of the shift alignment means 17 and comprise a subset of the seven bits of information already applied to multiplexer 32 and texture RAM 25. This address information identifies the bit position within the 32 bit word for parallel output on line 16.

The three bits of information on bus 48 are applied as single bits of information to lines 49 to 51. The bit on line 51 is employed to select the graphics line drawing mode used with the style and texture information or to disable the line imaging mode and select the character generation mode with information appearing on line 19. The mask high and mask low information on lines 49 and 50, respectively, is employed to fill half of the 32 bit word on line 16 with zeros and permits either the 16 low order or 16 high order bits to be so filled. Before referring to FIG. 2 it will be understood that the preferred mode of operation of the style and texture head control circuit of FIG. 1 is to generate full line graphics information comprising one or more rows of information and to modify the full line information so as to delete predetermined pixel information employing the novel style section and texture section head controller shown in FIG. 1.

Figure 2:
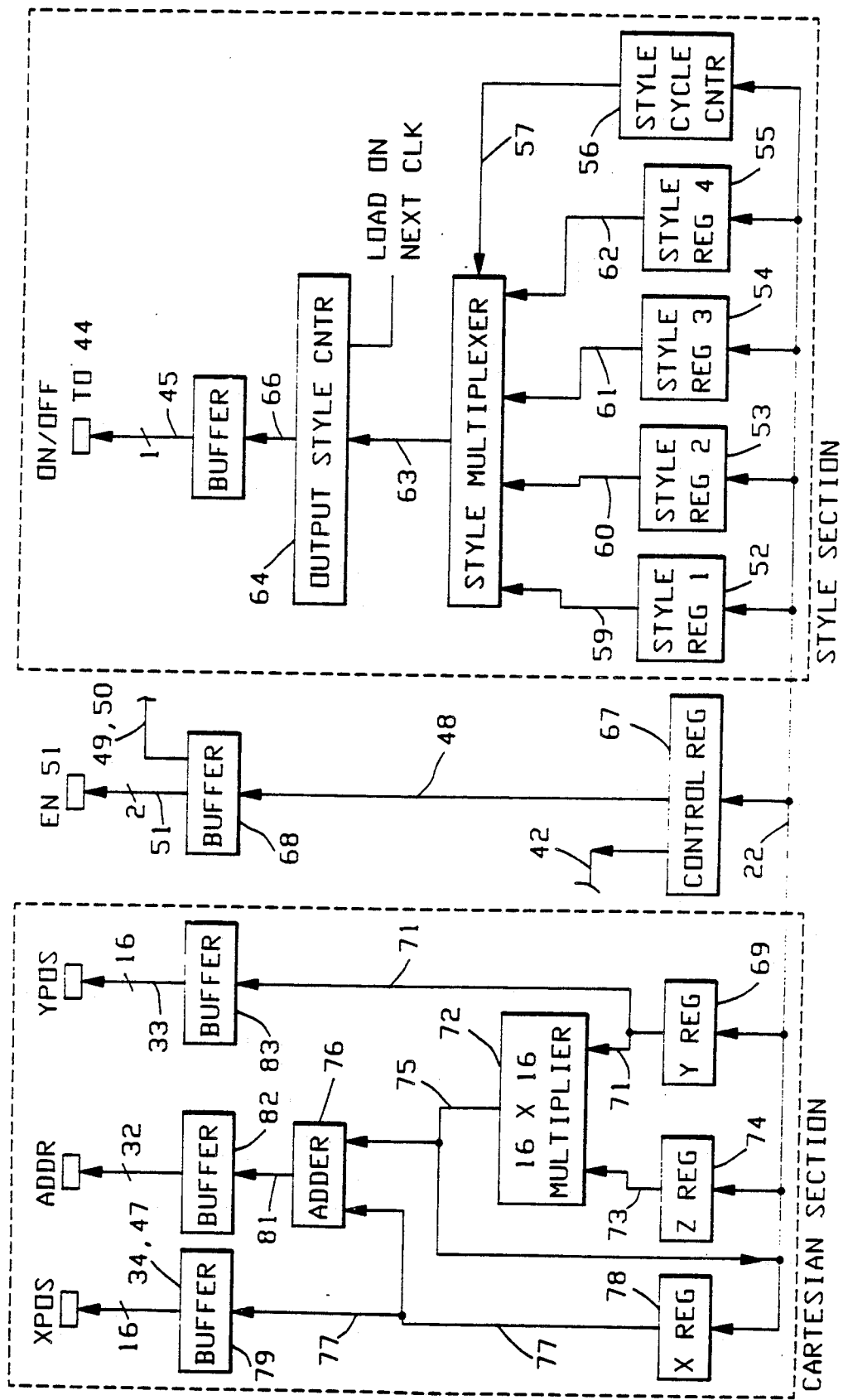
FIG. 2 is a more detailed block diagram of the style logic means of FIG. 1.

Refer now to FIG. 2 showing a plurality of style registers 52 to 55 coupled to processor data bus 22 at their inputs. The registers are sequentially controlled by style cycle counter 56 having an output control line 57 coupled to style multiplexer 58 which selects one of the outputs 59 to 62 from the style registers The output signal on line 63 is coupled to the input of output style controller 64. One of the 16 bits is applied to buffer 65 via lines 66 to provide the aforementioned style data bit on line 45 which is applied to gate 44. The other 15 of the 16 bits is employed to identify the length of the solid or continuous line by maintaining line 45 high for a predetermined length of time identified by the 15 bits.

Coupled to processor data bus 22 is the internal control register 67 which supplies the three bits on line 48. These bits are applied to a buffer 68 to produce the aforementioned signals on lines 50 to 51. Control register 67 also produces the enable signal on line 42 which is applied to the enabled input of OR gate 41.

Also connected to processor data bus 22 is an internal Y register 69 shown having an output on line 71 which is connected to one input of multiplier 72. The second input of multiplier 72 on line 73 comprises the output of the Z register 74. The output of the 16×16 multiplier 72 on line 75 is coupled to the input of adder 76 and coupled back to the input of bus 22. The second input to adder 76 is provided by line 77 which comprises the output of the X register 78. The output of X register 78 on line 77 is coupled to the buffer 79 to generate the aforementioned X position bits on lines 34 and 47. The output of adder 76 on line 81 is applied to a buffer 82 to produce the aforementioned bit map address on line 18. Similarly, the output of Y register 69 on line 71 is applied to a buffer 83 to produce the aforementioned Y position bit information on line 33.

In the preferred mode of operation, when employing the texture mode and selecting one of the matrix patterns from texture RAM 25, the minimum number of rows which identify a continuous line image are identified by and equal to the depth of rows of the matrix pattern selected.

The image processor 23 supplies information on bus 22 identifying the X position and the Y position with coordinate stored in registers 78 and 69. This information may be used as points on a line or points on a curve and successive points are generated by the image processor 23 which controls the scanning and generation of points in the row or X direction and sequentially in the Y direction to generate any desired curve and series of points which are so dense that even though they are generated as straight lines may appear as continuous curves when so desired. As will be explained hereinafter in the preferred embodiment, the line density of the matrix for pixel information is preferably the same in the vertical direction as it is in the horizontal direction presenting a square matrix which enables the generation of very finely defined curves and solid broad lines.

Refer now to FIGS. 3A to 3D showing line texture and style information FIG. 3A represents a continuous line with pixels so dense as to overlap The overlap occurs in the xerography process so as to present a solid line. The length of the line or page width is only limited by the expansion of the hardware which in the preferred embodiment employs 16 bit addresses which permits over a 100 inches of length at 300 pixels per inch density.

Refer to FIG. 3B showing a solid textured line in which a majority of the pixels shown in FIG. 3A are inhibited leaving only the desired textured pattern shown in FIG. 3B. This pattern is merely representative of any pattern that may be generated at the host computer and stored in the textured RAM 25 so as to generate an infinite number of solid textured lines.

Refer now to FIG. 3C showing the solid line 84 of FIG. 3A broken and printed out as an intermittent solid line having segments 85 through 88 interrupted by spaces during which the generation of the solid line 84 is inhibited. The structure employed to generate the inhibit or on/off signal was shown in FIG. 2 and style registers 52 to 55 which generates the on/off signal on line 45 to gate 44.

Refer now to FIG. 3D showing the solid textured line 89 generated as an intermittent line comprising solid textured line segments 91 to 94 generated in the same manner as style solid line shown in FIG. 3C.

Having explained a preferred embodiment of the present invention, it will be understood that a repertoire of patterns may be stored in image processing means 23 and written into texture RAM 25 during boot-up or start-up. Further, additional patterns may be written into texture RAM employing the keyboard of the host computer (not shown) While only four style registers 52 to 55 have been shown in the present illustration of FIG. 2 it will be appreciated that other segments and lines may be generated which may also be loaded by image processor 23 employing the keyboard of the host computer.

It will be noted from an examination of FIGS. 1 and 2 that the texture and style information is loaded in memory 25 and the registers and buffers shown in FIG. 2 and that this information is scanned during no more than two or three logic decision-making time before loading directly into the bit map memory 11. This enables the read out of the information previously stored and readily accessible to be loaded into write head buffer 14 for parallel read out at very high speed clock access times. The clock on line 15 for a laser printer must be sychronized with the sweep of the laser beam, but the information in write head buffer 14 need only be clocked as the sequential movement of the paper in the printer is moved. The movement of the paper for a light emitting diode printer head is continuously moving even though the pixel information written appears as dot pixel information.

What is claimed is:

1. A high speed print head control for style and texture of vector graphics line imaging, comprising:

print head buffer means for storing pixel data of graphic line information, bit map means coupled to said print head buffer means for storing a page of pixel information to be printed, shift alignment means for writing a word comprising a plurality of bits in an address of said bit map means, style logic means coupled to said shift alignment means for defining lines of data to be shift aligned and stored in said bit map means and for being presented to said print head buffer means for being printed, texture memory means for storing a plurality of matrix patterns having a data output line coupled to said shift alignment means for supplying predetermined bits of information defined by said matrix patterns to said shift alignment means, texture control means for selecting one of said matrix patterns stored in said texture memory means, and said shift logic means being coupled to said texture control means and said said texture memory means for determining the bits from said matrix patterns to be presented on said data output line to said bit map means.

2. A high speed print head control as set forth in claim 1 wherein said print head buffer means comprises a parallel in and serial out buffer register.

3. A high speed print head control as set forth in claim 1 wherein said style logic means comprises a plurality of style registers for alternately defining ON and OFF portions of said graphics line information.

4. A high speed print head controller as set forth in claim 3 which further includes a style multiplexer coupled to the output of said style registers.

5. A high speed print head controller as set forth in claim 4 which further includes a style cycle counter for selecting one of said plurality of said style registers for the output of said multiplexer.

6. A high speed print head control as set forth in claim 1 wherein said style logic means further includes means for converting X, Y cartesian coordinate to a bit map memory address, said address being coupled to said texture memory means.

7. A high speed print head control as set forth in claim 1 wherein said style logic means further includes an address output line coupled to said bit map means for defining a write address for loading said bit map means.

8. A high speed print head control as set forth in claim 1 where said bit map means further includes counter means for reading out a word from said bit map means to said buffer write head means.

9. A high speed print head controller as set forth in claim 1 wherein said shift alignment means further includes mask means for producing a word output to said bit map means which includes a predetermined number of zeros.

10. A high speed print head control as set forth in claim 1 wherein said style logic means includes control means coupled to said shift alignment means for selecting a style and texture mode or a character generation mode.

11. A high speed print head control as set forth in claim 10 which further includes a bit character generator coupled to said style alignment means.

* * * * *